Aug. 26, 1969     C. A. BURTON     3,463,513
TRAILER HITCH CONSTRUCTION
Filed Jan. 17, 1967
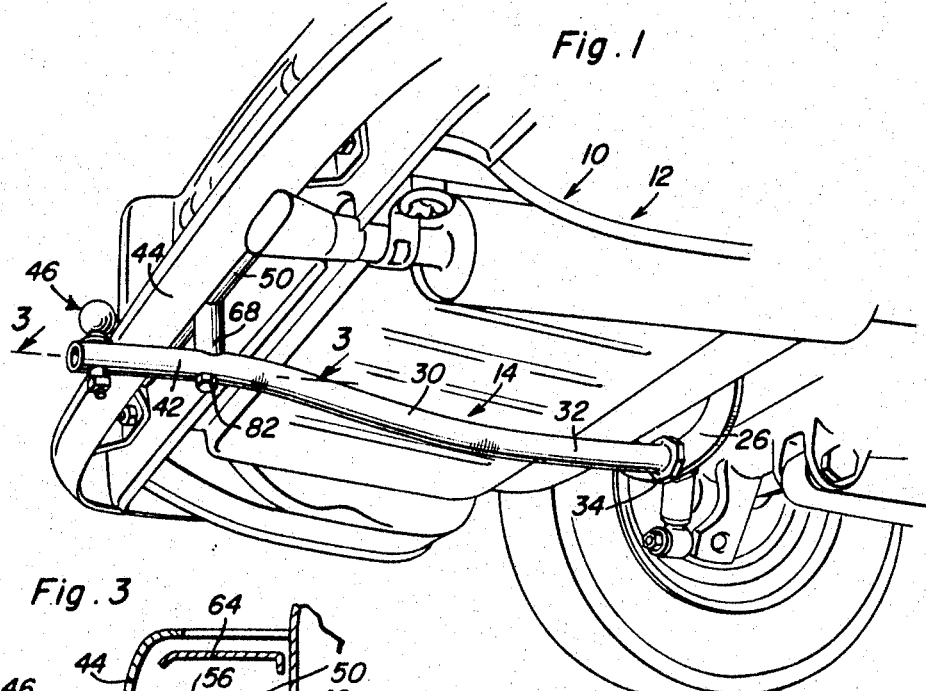
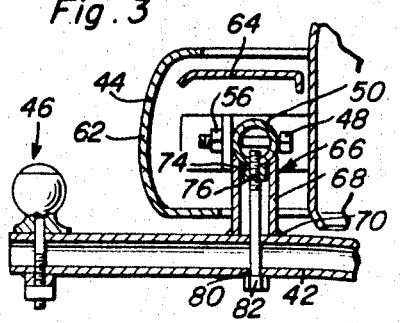
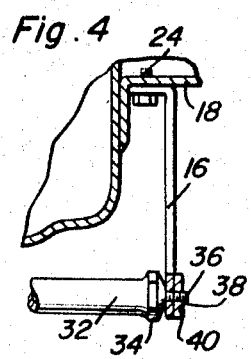
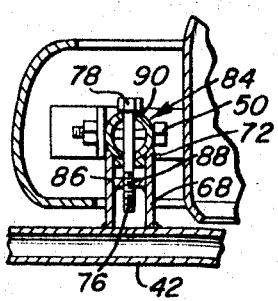
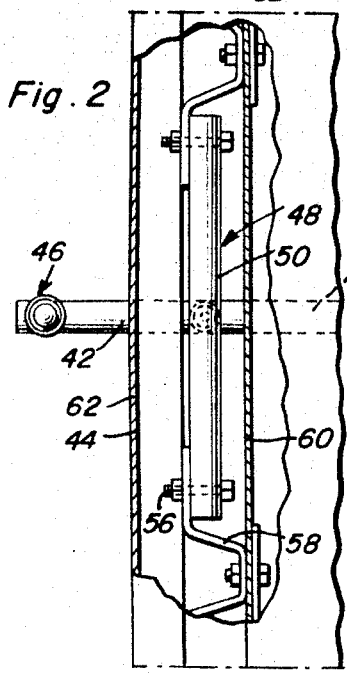
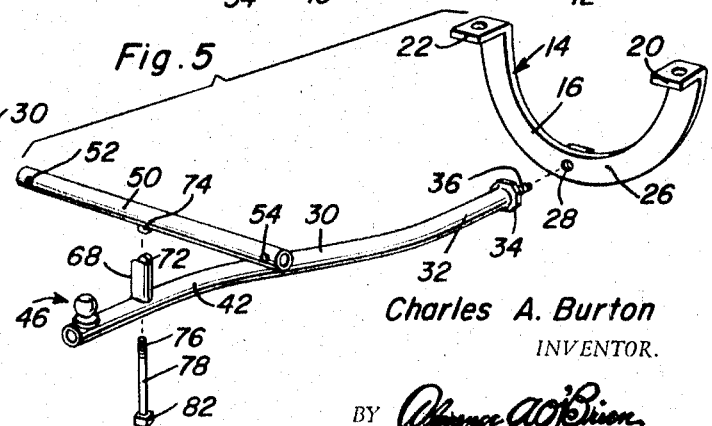
Charles A. Burton
INVENTOR.

United States Patent Office
3,463,513
Patented Aug. 26, 1969

3,463,513
TRAILER HITCH CONSTRUCTION
Charles A. Burton, 270 Idylwood Drive, SE.,
Salem, Oreg. 97302
Filed Jan. 17, 1967, Ser. No. 609,952
Int. Cl. B60d 1/00
U.S. Cl. 280—495   8 Claims

ABSTRACT OF THE DISCLOSURE

A hitch construction for a vehicle wherein a bracket member is mounted in a semipermanent concealed manner to the frame assembly forwardly of the rear crossbar and a support assembly is mounted in a semipermanent manner so that it is concealed by the rear bumper assembly of the vehicle with an elongated hitch tongue, when in use, extending longitudinally under the vehicle and provided with an inner end portion detachably connected to the bracket member and detachably connected to the support assembly by a pipe socket connection and having an outer end portion projecting rearwardly beyond the bumper assembly and carrying a hitch coupling.

---

An important object of the present invention is to provide a readily removable or detachable trailer hitch which includes semipermanently mounted supporting components and means which are concealed and not visible in normal viewing of a vehicle and an elongated hitch tongue which can be readily and easily attached to such supporting components and means in a facile manner without requiring special tools or skills.

Another important object of the present invention is to provide a detachable hitch assembly which does not put any twisting load on the frame or chassis of the automotive vehicle.

A further object of the present invention is to provide a durable, sturdy, efficient, compact and inexpensive concealed type trailer hitch construction, which combines strength and ease of attachment.

These together with other objects and advantages which will become subsequently apparent reside in the details of construction and operation as more fully hereinafter described and claimed, reference being had to the accompanying drawings forming a part whereof, wherein like numerals refer to like parts throughout, and in which:

FIGURE 1 is a fragmentary perspective view of the underside of the rear end of an automotive vehicle, illustrating the hitch construction of the present invention in assembled and connected relation with the vehicle;

FIGURE 2 is a sectional view of the rear bumper assembly, showing the support connection between the bumper assembly and the hitch tongue;

FIGURE 3 is a longitudinal vertical sectional view, taken substantially on line 3—3 of FIGURE 1 and illustrating in detail the means for securing the elongated tubular hitch tongue to the bumper support assembly, such means constituting a pipe socket connection;

FIGURE 4 is a fragmentary longitudinal vertical sectional view showing the means for attaching the front end of the hitch tongue to a bracket member which is attached to the bottom body panel or frame of the automotive vehicle well ahead of the rear cross member and the trunk compartment of the vehicle;

FIGURE 5 is an exploded perspective view of the hitch assembly, with the parts shown in unattached relationship; and, FIGURE 6 is a modified form of pipe socket connection between the hitch tongue and the bumper carriage support pipe, such modified pipe socket connection being utilized in place of the connection shown in FIGURE 3.

Referring now more particularly to the accompanying drawings, the motor vehicle, generally designated by the reference numeral 10 includes a chassis or frame 12. The trailer hitch 14 of the present invention includes a forward bracket member 16, which is attached to the bottom body panel 18 or may be attached to the frame 12. In any event, the bracket member 16 is positioned well ahead of the rear cross member and the trunk compartment.

As illustrated, the bracket member 16 is of arcuate or generally U-shaped configuration and the legs thereof terminate in apertured mounting flanges 20 and 22 which, in the illustrated instance are fastened by bolt assemblies 24. The flanges 20 and 22 laterally project from the vertically orientated bracket 16 and are fixed to the bottom body panel 18 so that the bracket 16 is suspended therefrom and is disposed perpendicularly. The web portion 26 of the U-shaped bracket member is provided with an opening 28 that extends completely therethrough, the axis of the opening being parallel with the longitudinal axis of the motor vehicle 10.

An elongated hitch tongue 30 is provided and, in the preferred instance, is of tubular pipe stock and has an inner closed end portion 32 provided with a noncircular enlargement 34 and from which an exteriorly threaded stud 36 axially projects. The stud is passed through the bore 28 and is threaded into an internally threaded bore 38 of a nut 40 which is fastened or made integral with the forward front face of the web portion 26. The noncircular enlargement 34 is adapted to be gripped by a wrench so that the threaded terminal stud 36 may be threaded into the nut 40 so as to secure the front or forward end of the longitudinally extending hitch tongue 30 to the bracket member 16.

The attachment of the front end of the longitudinally extending hitch tongue 30 to the bracket member 16 which is attached to the bottom body panel 18 or to any portion of the frame 12 ahead of the rear cross member and trunk compartment imparts to the hitch tongue a mechanical advantage to resist side pulls and twisting stresses caused by a connected trailer traveling over rough roads in particular.

The hitch tongue 30 includes a rear end portion 42 which projects rearwardly beyond the rear bumper assembly 44 of the motor vehicle and which is provided with a coupling means 46 in the nature of a ball member for forming a part of a conventional ball and socket connection.

Means is provided for attaching the rear end portion 42 of the trailer hitch tongue and such means is structurally associated with the motor vehicle so that it is concealed from normal viewing of the vehicle by the bumper assembly 44. As aforestated, the hitch tongue 30 is preferably formed from tubular stock so that it is in the nature of an elongated pipe and the means 48 for attaching the rear end portion 42 to the vehicle includes a pipe 50 which has opposite end portions provided with apertures 52 and 54 for the reception of the shanks of the bolt assemblies 56 which attach the bumper brackets 58 to the rear end 60 of the vehicle body or frame. Thus, the attaching or supporting pipe 50 is mounted inside of the bumper 62 and is disposed parallel therewith and concealed from view thereby, the bumper assembly having a cover plate 64 which covers the brackets and is utilized to cover the pipe 50 so that the supporting pipe 50 is not viewable in normal viewing of the motor vehicle 10.

A pipe coupling connection 66, as shown in FIGURE 3, is provided for easily and readily attaching the outer or rear end portion 42 of the pipe 30 to the supporting cross pipe 50. Such pipe coupling connection comprises a relatively short pipe section 68, which has its lower end secured, as by welding 70, to the rear end portion 42 so that it upstands therefrom, as shown in FIGURES 3 and 5. The pipe section 68 is formed with an open upper end 72, which is concaved or curved transversely of the pipe 68 so as to form a saddle end on which the cross pipe 50 firmly seats. The portion of the cross pipe 50 which seats in the saddle is provided with an integral depending, internally threaded boss 74 which is provided to receive the threaded end 76 of a bolt 78, the shank of which passes through aligned openings 80 in the rear end portion 42, such openings being in alignment with the interior of the pipe section 68 and the head 82 of the bolt being drawn up tightly against the underside of the rear end portion 42 of the pipe hitch tongue 30.

It can be appreciated that the bracket component or member 16 will be semipermanently attached by bolt means or other means to the motor vehicle ahead of the rear cross member and will be suspended vertically from the underside of the vehicle, substantially at the longitudinal center line of the frame of the vehicle, and that the cross pipe 50 will be semipermanently attached to the bumper assembly by means of the bolt assemblies 56 for the bumper brackets 58. The forward bracket component 16 and the rear support means 48 are carried more or less in permanent assembly with the motor vehicle 10 and are mounted in a secure manner and in a fashion so that they are concealed from view in the normal viewing of the motor vehicle 10, thereby offering no visual distraction from the appearance of the motor vehicle. Further, the bracket member 16 is positioned ahead of the rear cross member of the frame and the support means 48 is positioned in structural adjacency to the bumper assembly so that when the hitch tongue 30 is attached to the bracket 16 and supporting means 48 it will afford a sturdy and most effective hitch arrangement which will possess the mechanical advantage that it will resist side pulls and twisting stresses.

It can be appreciated that the hitch tongue 30 can be quickly and easily attached and detached without the use of any special tools or skill. All that is required is a wrench and in attaching the hitch tongue 30, the wrench engages the non-circular enlargement 34 to screw the forwardly projecting terminal stud into the nut 40, whereby the front end of the hitch tongue is quickly and easily attached to the bracket 16. The pipe section 68 will then be positioned so as to underlie the cross pipe 50 and, in particular, the portion from which the boss 74 depends, with the pipe 50 seating firmly in the saddle end 72 of the pipe section 68 and the boss 74 being received within the pipe section. The bolt 78 is then passed through the aligned apertures 80 and its threaded end 76 is threaded into the boss by applying a wrench to the head 82. This completes the mounting of the hitch tongue 30.

It can be appreciated that the tongue 30, when it is not desired to utilize the same for drafting a trailer, can be readily and easily dismounted by removing the bolt 78 and unscrewing the threaded stud 36. The two removed components, namely, the hitch tongue 30 and the bolt 78, can then be stored in the trunk or other storage compartment of the motor vehicle 10 so that they will be readily available for use when desired.

A modified form of coupling connection 84 is shown in FIGURE 6, wherein the upstanding pipe section 68 terminates in a saddle end 72 within which the cross pipe 50 firmly seats. However, in lieu of the threaded boss 74, the pipe section 68 is formed with a partition wall 86 which has an internally threaded bore 88 and the cross pipe 50 is provided with vertically aligned apertures 90 to receive the bolt 78 which has its threaded end portion 76 threaded into the threaded bore 88 of the partition wall 86. In the pipe coupling arrangement 84, it can be seen that the bolt extends downwardly and the threaded portion is threaded into the partition wall 86, whereas in the pipe coupling arrangement 66 of FIGURES 1 to 5, the bolt 78 extends upwardly and its threaded end is threaded into a boss 74 which depends from the underside of the cross pipe 50. The pipe section 68 has a saddle end which receives the cross pipe 50 in a secure fashion, with the pipe tongue hitch 30 and the support cross pipe 50 being disposed at right angles and a bolt being utilized to attach the cross pipe 50 in its seated interconnecting pipe section 68.

What is claimed as new is as follows:

1. In combination with a vehicle of the type provided with a rear transverse bumper assembly including a bumper bar and a sturdy portion spaced appreciably forward of said bar and the portion of said vehicle from which said assembly is supported, a bracket member secured to said sturdy portion with the bracket member concealed from sight in normal viewing of the vehicle, a support assembly supported from said bumper assembly forward of said bar so that it is concealed from view from the rear of said vehicle by said bumper bar, an elongated hitch tongue arranged longitudinally of the vehicle and having its forward end portion releasably attached to said bracket member, the rear end portion of said tongue extending rearwardly beyond said bar, means releasably attaching said rear end portion to the support assembly, said sturdy portion being elevated relative to said bumper bar and said bracket member depending from said sturdy portion so as to include a lower portion generally horizontally aligned with the lower extremity of the central portion of said bar and to which said forward end portion is secured, said means for releasably attaching the forward end portion of the hitch tongue to the lower extremity of said bracket member comprising a threaded bore carried by said lower extremity, said hitch tongue having a threaded stud projecting axially from its forward end portion, the hitch tongue being bodily rotatable about its long axis and having said stud threaded into said bore so as to releasably anchor the forward end portion of the hitch tongue to the bracket member.

2. In combination with a vehicle of the type provided with a rear transverse bumper assembly including a bumper bar and a sturdy portion spaced appreciably forward of said bar and the portion of said vehicle from which said assembly is supported, a bracket member secured to said sturdy portion with the bracket member concealed from sight in normal viewing of the vehicle, a support assembly supported from said bumper assembly forward of said bar so that it it concealed from view from the rear of said vehicle by said bumper bar, an elongated hitch tongue arranged longitudinally of the vehicle and having its forward end portion releasably attached to said bracket member, the rear end portion of said tongue extending rearwardly beyond said bar, means releasably attaching said rear end portion to the support assembly, mounting brackets being provided for supporting said bumper bar rearwardly of said vehicle, said support assembly including an elongated support member semipermanently attached to said brackets and disposed parallel with and forward of said bumper bar so as to be concealed thereby, said means releasably attaching said rear end portion to said support assembly including a vertically elongated coupling member connected at its upper and lower ends to said support member and hitch tongue, respectively, said hitch tongue being of tubular stock in the nature of a pipe and said support member being constituted by a pipe, said coupling member comprising including a fixed upstanding pipe section on the rear end portion of the pipe hitch tongue, said pipe section having a concave saddle upper end in which the cross support member pipe is securely seated, and a bolt assembly removably securing said cross support pipe in the saddle end of the pipe section.

3. A pipe socket connection adapted to be used with a trailer hitch connection comprising a first pipe, a second pipe arranged normal to and spaced from the first pipe, an attaching pipe fixed to and laterally extending from one of said pipes and having an outer end portion terminating in a free end, said free end being curved transversely of the longitudinal axis of the pipe from which it extends to define a concave seat in which the other pipe is seated and a bolt connection for connecting the attaching and other pipes together and including means disposed within the attaching pipe and a bolt having its threaded shank threaded in said last means.

4. The invention of claim 3, wherein said last named means includes a threaded boss fixed to the other of said pipes seated in said seat on the attaching pipe, the pipe from which the attaching pipe laterally projects having aligned openings in alignment with the interior of the attaching pipe and said boss being disposed within the attaching pipe and the bolt passing through the aligned openings and having its threaded portion threaded into the boss.

5. The invention of claim 4, wherein said last named means includes aligned openings in the pipe seated in the seat of the attaching pipe, said openings being in alignment with the attaching pipe, said attaching pipe having a partition wall provided with a threaded bore and the bolt passing through the aligned openings in the seated pipe and having its threaded shank threaded in the bore in the partition wall.

6. In combination with a vehicle of the type provided with a rear transverse bumper assembly including a bumper bar and a sturdy portion spaced appreciably forward of said bar and the portion of said vehicle from which said assembly is supported, a bracket member secured to said sturdy portion with the bracket member concealed from sight in normal viewing of the vehicle, a support assembly supported from said bumper assembly forward of said bar so that it is at least substantially concealed from view from the rear of said vehicle by said bumper bar, an elongated hitch tongue arranged longitudinally of the vehicle and having a single threaded generally, coaxial endwise outwardly projecting stud on its forward end portion threadedly engaged with said bracket member, the rear end portion of said tongue extending rearwardly beneath and beyond said bar, said tongue including upwardly projecting spacer means projecting upwardly in front of said bar and abutted against said support assembly, and means releasably securing said spacer means and tongue to said support assembly.

7. In combination with a vehicle of the type provided with a rear transverse bumper assembly including a bumper bar and a sturdy portion spaced appreciably forward of said bar and the portion of said vehicle from which said assembly is supported, a bracket member secured to said sturdy portion with the bracket member concealed from sight in normal viewing of the vehicle, a support assembly supported from said bumper assembly forward of said bar so that it is concealed from view from the rear of said vehicle by said bumper bar, an elongated hitch tongue arranged longitudinally of the vehicle and having a threaded forward end portion threadedly engaged with said bracket member, the rear end portion of said tongue extending rearwardly beneath and beyond said bar, said tongue including upwardly projecting spacer means projecting upwardly in front of said bar and abutted against said support assembly, and means releasably securing said tongue to said support assembly, said spacer means comprising an upstanding tubular member and the means releasably securing said tongue to said support assembly includes an upstanding elongated fastener secured through said tongue and extending upwardly through said tubular member, the upper end of said fastener being secured to said support assembly.

8. The combination of claim 7 wherein mounting brackets are provided for supporting said bumper bar rearwardly of said vehicle, said support assembly including an elongated support member semipermanently attached to said bracket and disposed parallel with said bumper bar.

References Cited
UNITED STATES PATENTS

| | | | |
|---|---|---|---|
| 2,622,892 | 12/1952 | Lowman | 280—495 |
| 2,747,892 | 5/1956 | Jones | 280—495 |
| 2,554,711 | 5/1951 | Lowman | 280—495 |
| 2,639,160 | 5/1953 | Studebaker | 280—495 |
| 2,711,908 | 6/1955 | Saxon | 280—406 |
| 2,773,704 | 12/1956 | Saxon | 280—489 |
| 2,898,124 | 8/1959 | Bernard et al. | 280—406 |
| 3,353,842 | 11/1967 | Lewis | 280—489 |

LEO FRIAGLIA, Primary Examiner